Nov. 5, 1935.  E. F. HATHAWAY  2,020,243
YARN SPOOL
Filed Dec. 24, 1930  2 Sheets-Sheet 1
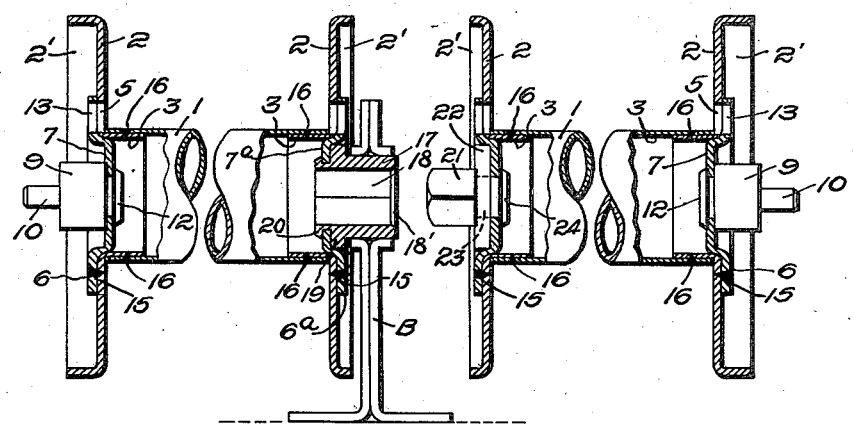

Nov. 5, 1935.   E. F. HATHAWAY   2,020,243
YARN SPOOL
Filed Dec. 24, 1930   2 Sheets-Sheet 2
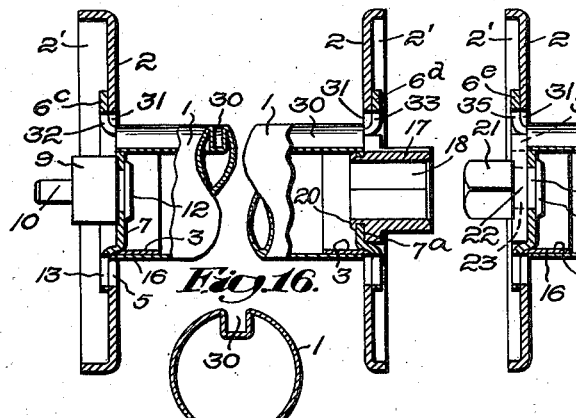
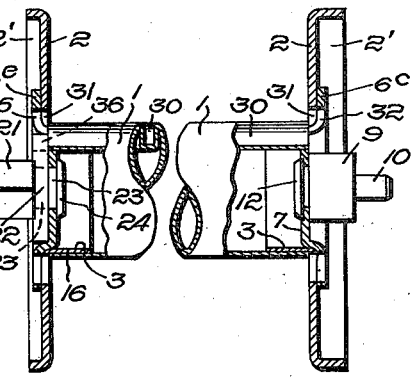
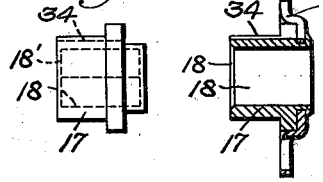
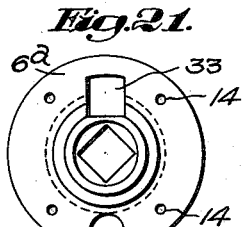
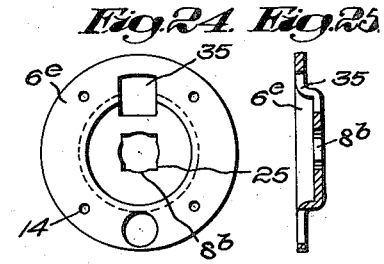
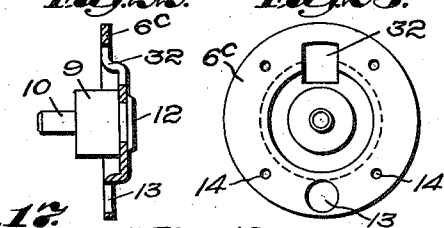
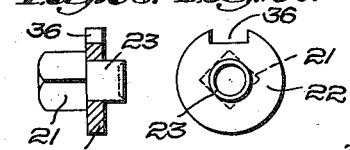
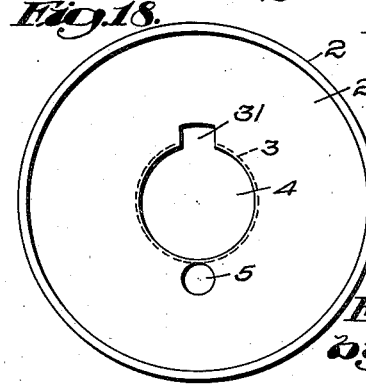
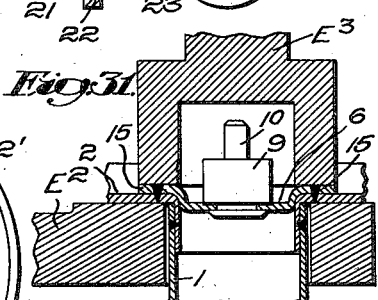

Patented Nov. 5, 1935

2,020,243

UNITED STATES PATENT OFFICE 2,020,243

YARN SPOOL

Edgar F. Hathaway, Wellesley, Mass., assignor to Shawmut Engineering Company, Dorchester, Mass., a corporation of Massachusetts Application December 24, 1930, Serial No. 504,535

8 Claims. (Cl. 242—118)

My present invention relates to spools for yarns, and particularly for holding the tuft yarn supplies in connection with the manufacture of tufted or pile fabrics, such as Axminster carpets, and to methods of making such spools. It aims to provide in such spool a simplified, light-weight but rugged and otherwise improved structure, adapted for ready assembly by spot-welding or otherwise, and to improve the process of construction of devices of the class described.

In the drawings, illustrating certain embodiments of the invention, and methods of constructing the same, by way of example, Figure 1 is a longitudinal section through a spool, with a portion of the barrel in elevation and with the central barrel portion broken away, the section being on the line 1—1 of Fig. 9;

Fig. 2 is a corresponding view of a similar spool for use in conjunction with the spool of Fig. 1;

Figs. 3 and 4 are respectively a cross-section and an end view of a spool head;

Fig. 5 is a side elevation of a socketed hub for one end of the spool of Fig. 1, the end at the right in said figure;

Fig. 6 is a cross-section of the socketed hub of Fig. 5 assembled with its carrier element or disk, being a section on the line 6—6 of Fig. 7;

Fig. 7 is an end elevation of the parts shown in Fig. 6, as viewed from the left in said figure or from the right in Fig. 1;

Fig. 8 is a view corresponding to Fig. 6 showing parts at the opposite or left end of the spool of Fig. 1 and also at one end, the right end, of the spool of Fig. 2, being a section on the line 8—8 of Fig. 9;

Fig. 9 is an end elevation corresponding to Fig. 7 of portions of the outer ends of the spools of either Fig. 1 or Fig. 2;

Figs. 10 and 11 are respectively an elevation and a cross-section of the hub carrier or disk such as used at either end of either spool, with the exception that the central aperture in said disk may be somewhat larger when the disk is to be used at the inner or right end of the spool of Fig. 1;

Fig. 12 is a view partly in section and partly in side elevation of a pin such as illustrated at the inner or left end in the spool of Fig. 2;

Fig. 13 is an end elevation of the pin of Fig. 12, looking toward the left in said figure;

Figs. 14 to 27 illustrate further embodiments of the invention, particularly in connection with spools whose barrels are longitudinally slotted for the reception of a clamping rod or bar for anchoring the yarn ends. In said figures Figs. 14 and 15 are longitudinal sectional views corresponding to Figs. 1 and 2, illustrating cooperating spools;

Fig. 16 is a cross-section of the spool barrel;

Figs. 17 and 18 are a cross-section and an elevation respectively of a spool head;

Figs. 19 to 27 inclusive correspond respectively to Figs. 5 to 13 but illustrate the head construction as applied to the slotted barrel type of spool such as those of Figs. 14 and 15;

Fig. 28 is a cross-section through a spool head also embodying the invention but having a modified and universal form of interlocking hub for the inner end of the spool;

Fig. 29 is an end view of the hub of Fig. 28; and

Figs. 30 and 31 are partly diagrammatic sectional views illustrating two operations of a construction process as it may be practiced in accordance with my invention, and which are made possible by reason of the illustrated structure of the invention.

Referring first to the spools of Figs. 1 to 13, they each comprise a barrel 1, generally in the form of a metal tube of appropriate length and diameter, at least the end portions being hollow. In some instances the spool barrels may comprise an intermediate portion of wood or other material, with metal ferrules at their ends to provide the hollow portions. At the ends of the barrel are the spool heads or end heads 2, one of which is seen separately in Figs. 3 and 4. They are shown as circular plates having an outwardly extending peripheral flange 2' and an opposite or internal annular flange or collar 3 disposed centrally of the head and surrounding a central aperture 4. Each head is also preferably provided with a smaller aperture 5, for the reception of a locking pin such as generally found on a threading machine.

The spools of Figs. 1 and 2 are shown in axial alignment substantially in the position as mounted on a yarn carrier or "tube frame" for a loom, but longitudinally spaced, prior to interlocking their adjacent ends. A bearing such as may be used at a point intermediate the ends of the yarn carrier or "tube frame" is indicated at B in Fig. 1, it being assumed in the present instance that the frame is to hold two spools, for example two 54 inch spools, but obviously the spool construction of the invention may be utilized in connection with frames for other numbers of spools; for a single-spool frame, both spool heads would be as at the left in Fig. 1 or at the right in Fig. 2, while with frames for more than two spools the intermediate spool or spools would each have one head similar to that at the right of Fig. 1 and the other such as at the left in Fig. 2.

The outer ends of the end spools of a series, as at the left in Fig. 1 and at the right in Fig. 2, are provided with journal elements shown as pintles whereby the spools may be rotatively received in the spool brackets at the ends of the frame, while the inner ends of such spools, or both ends of any intermediate spools, are arranged for reception in an intermediate bracket of the frame, one such intermediate bracket being shown in Fig. 1 with a portion of the frame dotted, and for interlocking with the end of the adjoining spool, to prevent relative rotation between the spools of the series, whereby they will turn as a unit.

In accordance with my invention as illustrated, the journal or bearing means at any spool end, including the pintle means at the outer ends of an end spool and the interlocking journal means at the inner or internal spool ends, are mounted upon and connected to the respective spool heads in a similar manner, and by means of an attaching or supporting element, carrier or plate, which may be substantially identical at either end of the spool, with the possible exception of the diameter of the central aperture provided. In some instances this attaching element may be in the form of a mounting flange formed on the journal, bearing element or gudgeon, but preferably the gudgeon is riveted to, set onto, or otherwise connected to its attaching element, for example, as in the manner to be described.

Referring now to Figs. 8 and 9, the gudgeon-attaching element, carrier or plate 6 as there shown is of disk form and has a central struck-in portion or boss 7, centrally apertured as at 8. This aperture 8 receives the journal element or gudgeon 9 having a main portion of a diameter exceeding that of the aperture, a reduced pintle portion 10, at its outer end, and a rivet portion 11 at its opposite or inner end. The rivet portion of the gudgeon is inserted through the aperture 8 of the carrier and is headed down, as indicated at 12, Figs. 1, 2 and 8, thus securely uniting these parts. The carrier 6 has an aperture 13 in its rim portion, to correspond with the locking aperture 5 of a spool head.

The internal boss 7 of the carrier is shaped and proportioned to have an accurate centering fit within the outer end of the internally extending collar 3 of the spool head, the inner edge portion of the carrier boss desirably being somewhat beveled or rounded, as indicated at 7', Fig. 8, for guiding and centering reception in the correspondingly formed end portion of the spool head collar. Thus the journal element, bearing element or gudgeon, being centrally connected to the carrier, is likewise accurately centered relative to the spool head.

Each spool head as herein shown thus comprises the head or end proper 2, a journal element or gudgeon (several forms of which appear in the various figures) and means for attaching the gudgeon to the head, independently of and/or by a separate operation from, the connecting of the latter to the spool barrel. By reason of this construction I attain one important object of the invention, both in the resulting structure and in the method or process of forming it. As a preferred step in the method, a spool head is first welded to the hollow barrel end, and desirably spot-welded. To obtain an efficient spot-weld it is desirable, if not essential, to have the electrodes applied in direct opposition, to have the metal parts to be welded of not too great difference in thickness, and to have the electrodes in direct contact respectively with the two parts to be joined.

With these factors in view, I have so constructed and arranged the parts as to permit an efficient spot-welding of the spool head to its hollow barrel end, by enabling the journal element or gudgeon to be subsequently connected to the head, also preferably by spot-welding. Accordingly, a spool head is fitted to the hollow barrel end, by telescoping its collar 3 therewith, either externally or internally, preferably the latter, as shown in Figs. 1 and 2, and in detail in Fig. 30. Since the head collar 3 is open, access can still be had to the interior of the barrel, through this relatively large opening, of approximately the same diameter as the spool barrel. I can therefore apply one electrode E, Fig. 30, inside the barrel end, within the head collar 3, applying the other electrode or electrodes E1 externally and directly opposite the first, the outside and inside electrodes being respectively directly in contact with the two parts to be welded. Conveniently the interiorly applied electrode E is in the form of a plug fitting into the central aperture in the spool head and its collar. The spool barrel 1 and the head 2 are turned, after each weld operation, to present the desired plurality of points to the outer electrode E1, as will be understood from the partially diagrammatic Fig. 30. Thus the barrel and head are effectively spot-welded together, as contrasted, for example, with any construction wherein an attempt is made to weld through several pieces of thick metal, including, for example, a gudgeon in the form of, or having, a block or plug inserted in and closing the barrel before the head is welded to the barrel and intended to be welded therein in the same weld operation in which the barrel and head are connected.

In continuing the method of my invention, the journal element, bearing element or gudgeon, such as element 9 of Figs. 8 and 9, element 17 of Figs. 5 to 7 or 21 of Figs. 10 to 13, and the corresponding elements in Figs. 14 to 27, is fixed on the attaching element or carrier 6 or 6a or 6b, etc., by welding, by turning over a portion of the gudgeon, as illustrated, or otherwise. The carrier or attaching element is then applied to the spool head, previously welded onto the barrel as in Fig. 30, and is welded or otherwise secured thereto, preferably as illustrated in Fig. 31.

The carrier 6 is adapted for rigid attachment to the spool head, preferably by spot-welding. As best seen in Figs. 8 and 9 it is provided for this purpose with a plurality of indentations or "spots" 14 struck-in from its outer face, at the left in Fig. 8, and forming slight protuberances 15 at the opposite or inner face of the disk, where it abuts flatwise against the spool head. Any suitable plurality of such weld "spots" may be employed, four being shown in the present instance, as indicated at 14, 14, etc., Figs. 8 and 9. The electrodes of the welding apparatus are desirably constructed and arranged to apply the several spot-welds between the carrier and spool head simultaneously.

In said partly diagrammatic Fig. 31, one electrode E2 is formed to abut flatwise against the inner face of the spool head 2, and the directly opposed electrode E3, of general cup shape at its end, is applied directly against the outer face of the attaching element or carrier 6, making direct contact with it entirely around it, or throughout a substantial arc. The desired plurality of spot-welds 15, depending on the number of "spots" or points 14 provided (see Figs. 7, 9 and 10) are thus formed in one operation.

It will now be understood that with the described process and construction I obtain a highly efficient spot-welded connection of the spool head and barrel, wherein, as in Fig. 30, the electrodes are directly applied in opposed relation to the two parts to be joined, namely, the spool head collar 3 and barrel 1, these parts also being of approximately the same thickness at the region to be welded. I further obtain an accurate, centering of the journal element or gudgeon and an efficient welding attachment therefor, in conjunction with the adequately welded spool head and barrel construction, by the provision of the attaching means or flange, such as the carrier 6, in such form as to be readily accessible to the welding electrodes, as in Fig. 31, after attachment of the head to the barrel. The result is an extremely strong, rugged spool structure but light in weight (as compared for example with a solid gudgeon or plug of substantially the diameter of the spool barrel and set into its end) and of reduced manufacturing cost.

In Figs. 5, 6 and 7 I have shown an attaching means or carrier 6a and a journal element in the form of a socketed bearing, gudgeon or hub 17 for the inner end of a spool, for example, the right end of the spool of Fig. 1. The spool head 2 is the same as previously described, as is also the carrier 6a, including the central boss 7a, save that its central aperture 8a is somewhat larger. The journal or hub element 17 is of generally cylindrical form, of suitable diameter to provide a socket portion 18, of desired size and also to adapt it for reception in the bearing of an intermediate spool bracket of a carrier frame, as indicated at B, Fig. 1. It has a preferably integral annular shoulder 19 near its inner end, the inner edge of which may be beveled or rounded to assist in seating it accurately within the boss 7a of the carrier. The socket portion 18 of the hub may be of any non-circular shape in cross-section, being illustrated as square and as extending entirely through the hub element. It is desirably beveled at its outer end, as at 18' to assist in entering the corresponding male portion of another spool. The inner end of the hub is of sufficient length to extend inwardly beyond the carrier, where it is headed down in the manner of a rivet, as indicated at 20, thus securely connecting the carrier and its hub. In practice it has been found preferable to extend the socket entirely through the hub, as illustrated, but this is not necessary, as in some instances the inner end of the hub may be in the form of a rivet such as that of the gudgeon 9 for the outer ends of the spools.

The united attaching element or carrier 6a and the journal element, gudgeon or hub 17 of Figs. 5 to 7 are attached to the previously welded and barrel spool head preferably in the manner described, a plurality of weld points being indicated at 14, 15, in said figures.

In Figs. 10 to 13 I have illustrated in detail an attaching means or carrier 6b and supporting pin, gudgeon or journal element as used in conjunction with the head construction as at the right in Fig. 1, the carrier itself being substantially the same as previously referred to. It supports a pin having a head 21 of corresponding cross-sectional shape as the socket 18 of the adjoining spool, in this instance square. A collar 22 is placed on the pin to the rear of the square head portion, or if preferred may be formed integrally with it. The inner end of the pin constitutes a rivet portion 23, to be turned down against the inner face of the carrier, as at 24, Fig. 2. The united carrier and pin are assembled with and welded to the previously welded spool head 2 in the manner already described. As seen in Figs. 10 and 11 the central aperture 8b in the carrier has a plurality of angular notches 25 about its edge. When the rivet portion of the pin 21 is headed down, portions of the material will be forced into these notches or short slots, see Fig. 11, thus resisting any tendency of the pin to turn with respect to the carrier.

Referring now to Figs. 14 to 27 inclusive, the invention is there illustrated in connection with spools whose barrels 1 contain each a longitudinal groove 30, see particularly Fig. 16, for the reception of a rod or bar for anchoring the ends of the yarns on the spool. The various parts are modified to permit passage of such bar through a spool head. Any parts not otherwise referred to may be considered to be the same as in the figures previously described.

As seen in Figs. 17 and 18, the spool heads 2 have a slotted portion 31 set off from their central aperture and adapted to align with the groove 30 of the spool barrel. The carrier 6c, Figs. 22 and 23, for an outer spool end has, in addition to the features previously described in connection with Figs. 8 and 9, a substantially rectangular aperture 32 likewise adapted to align with and to receive the end wall portions of the groove 30 of the spool barrel and to register with the slot 31 of the spool head. The same is true in connection with the parts illustrated in Figs. 19 to 21, for the inner end of the spool of Fig. 14. Their construction is similar to that of Figs. 5 to 7 with the addition, on the carrier 6d, of a substantially rectangular aperture 33, for alignment with and for receiving the walls of the barrel groove 30, and to align with spool head slot 31. Similarly the socket portion and the shoulder of the journal or hub element 17, Figs. 19 and 20, are flattened and slotted respectively, as at 34 in said figures. Referring now to Fig. 15 and Figs. 24 to 27, the several parts are in general similar to those of Fig. 2 and Figs. 10 to 13 inclusive. In this instance the carrier 6e, in addition to the other features above noted, has an approximately rectangular aperture 35 which, in welding or otherwise attaching the disk to its spool head, is brought into alignment with the slot 31 of the latter and the groove 30 of the spool barrel, receiving the end wall portions of said groove formation. As seen in Figs. 26 and 27, the collar element 23 of the central pin is slotted, as at 36, for a similar purpose.

In some instances it is desirable to provide a universal form of spool head structure, referring to the positioning of spools upon a carrier or tube frame. In such case not only are the outer spool ends each identical with the other, but the inner ends are also mutually identical, so that any given spool may be used in interlocking association with any other spool, as contrasted with the inner end construction of the spools of Figs. 1 and 2, and of Figs. 14 and 15. Referring to Figs. 28 and 29, Sheet 1, the spool head 2 and carrier 6 with its boss 7 are similar to those already described. The carrier has attached centrally thereof a journal element shown as a combined bearing and clutch element 40 having a rivet portion 41, Fig. 28, at its inner end adapted to be headed down against the inner face of the carrier, as at 42. At its outer end this bearing and clutch member is formed with one or more longitudinally projecting lugs or teeth 43 and intermediate slot portions 44. The outer side surfaces of the lugs 43 are preferably in the form of portions of a cylinder, whereby they may have bearing engagement with the bearing of an intermediate spool bracket of a tube frame or carrier, as in Fig. 1. An annular flange 45 is formed on the member 40, corresponding to the flange 19 of the socketed bearing 17 of Figs. 5 and 6 or the collar 22 of Figs. 12 and 13. This flange portion, as in the preceding figures, serves not only as a base in mounting the journal or bearing member on its carrier but also as an end-thrust bearing for the spool bracket B, Fig. 1, of the supporting frame. Any two spools each having one end constructed as in Figs. 28 and 29 are adapted for interlocking engagement, when disposed with their similar ends adjacent each other, the tongues 43 of one seating in the slots 44 of the other. It will be understood that the universal spool structure of Figs. 28 and 29 is equally applicable for use either with a non-grooved spool barrel, as in Figs. 1 to 13, or with a grooved spool barrel, as in Figs. 14 to 27.

From the foregoing it will be understood that the construction and method of my invention, involving an efficient direct welded connection of a spool head and its barrel and the provision of attaching means for a journal element or gudgeon of a character permitting the subsequent efficient mounting of said element upon the already interattached spool head and barrel, are universally applicable to various forms of yarn spool structure, such as in the illustrative embodiments shown. It will be noted that herein the terms "journal element" or "bearing element" refer broadly to means for rotatably positioning the spool, including all such means as the various forms of pintles, gudgeons, pins, plain or socketed bearings or hubs, with or without clutch formations, and like members, such as shown in the several figures of the drawings by way of illustration.

My invention is not limited to the particular embodiments herein illustrated and described by way of example, its scope being pointed out in the following claims.

I claim:

1. A yarn spool head structure comprising, in combination; an end head formed with a collar for supporting reception by a spool barrel; a separately formed journal-supporting plate including a circular rim portion of greater diameter than the spool barrel but substantially less than that of the spool head, said rim portion secured centrally against the end head, and a concentric boss portion, the end head having a concentric formation receiving said boss portion; and a journal element centrally attached to said plate.

2. In a yarn spool, in combination, a barrel having a tubular metallic end, a head having a collar telescoped with and welded to a barrel end, a plate, of relatively small diameter as compared with said head, having a central circular boss seated in the outer end of said collar, said plate having its portion surrounding the boss positioned flatwise against and welded to the outer face of the head, and a journal element disposed centrally of and fixed to the plate.

3. In a yarn spool, a barrel having tubular metallic ends, spool heads having collar portions fitted to the respective barrel ends, central plate-like journal carriers concentric with and attached to the spool heads and having centering means cooperating with said collar portions, and journal elements attached to the respective carriers.

4. In a yarn spool, a barrel having tubular metallic ends, spool heads having collar portions fitted to the respective barrel ends, plate-like journal carriers having internal means for centering them with respect to the spool heads, and having central apertures, a journal element including a journaling portion and an attaching portion seated in the aperture of one carrier, and a similarly-seated journal element attached to the other carrier and having a hub portion provided with formations for interlocking it coaxially with another spool.

5. In a yarn spool, in combination with a barrel having an open metallic end, an end head having a central aperture and a flange surrounding the aperture, said flange received by and spot-welded to the barrel end, a carrier having an inwardly projecting portion adapted to seat inside the aperture of the end head and to position the carrier concentrically of the latter, said carrier directly contacting and welded to the end head, and being provided with a central aperture, and a journal member having a supporting portion mounted in said aperture of the carrier.

6. A yarn-spool end structure comprising, in combination, a spool head having a central aperture and concentrically disposed connecting means adapted to be received by and to be secured to a barrel end, a journal member to be disposed centrally of the spool head, and substantially circular plate-like attaching means centrally supporting the journal member, said attaching means having a concentric formation for reception within said aperture of the spool head in a manner to effect centering of the journal member with respect to the head and to the barrel end to receive the latter, and said attaching means arranged to overlap the portion of the head surrounding said aperture sufficiently to provide for welding connection of the attaching means to the head.

7. In a yarn spool, in combination with a barrel having an open metallic end, an end head provided with a central aperture and with centrally disposed connecting means received by and positively connected to the end of the barrel, a journal element for rotatably positioning the spool, and flange-like attaching means for the journal element, of a diameter intermediate that of the journal element and the spool head, the journal element being disposed centrally of and connected to said attaching means so as to form a unit with it for assembly purposes, said unit having integral concentric longitudinally extending means for centering it with respect to the spool head and barrel end, and said attaching means of said unit having its peripheral portion overlapping and positively connected to the spool head.

8. In a yarn spool, in combination with a barrel having an open metallic end, an end head provided with a central aperture and a concentric attaching collar received by and welded to the end of the barrel, a journal element for rotatably positioning the spool, and an attaching plate having an integral circular boss and an aperture centrally of the boss, the journal element having a reduced inner portion extending through said aperture of the boss and headed down against the inner face of the latter to secure the journal element to the attaching plate, said boss received with the central aperture of the spool head and serving to center the journal element with respect to the head and the barrel end, and said plate carrying the journal element having flatwise overlapping engagement with the outer face of the spool head and being welded to the latter at said overlapped portion.

EDGAR F. HATHAWAY.